(No Model.)
J. A. MALONEY.
SECONDARY BATTERY.
No. 271,880. Patented Feb. 6, 1883.
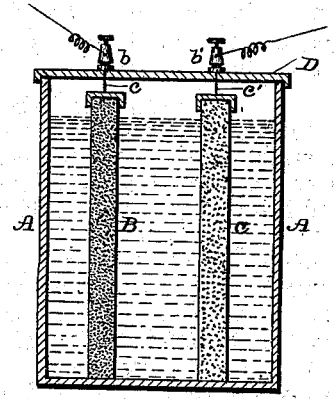
Witnesses
W. B. Masson
A. K. Parris
Inventor
James A. Maloney

UNITED STATES PATENT OFFICE.

JAMES A. MALONEY, OF WASHINGTON, DISTRICT OF COLUMBIA, ASSIGNOR TO S. H. CARNEY, TRUSTEE, OF NEW YORK.

SECONDARY BATTERY.

SPECIFICATION forming part of Letters Patent No. 271,880, dated February 6, 1883.

Application filed November 22, 1882. (No model.)

*To all whom it may concern:*

Be it known that I, JAMES A. MALONEY, a citizen of the United States of America, residing at Washington, in the District of Columbia, have invented certain new and useful Improvements in Secondary Batteries, of which the following is a specification, reference being had therein to the accompanying drawing.

My invention relates to secondary batteries, and has for its object the use of plates of less weight than those now in use, and which require no coatings to increase their gas-absorbing qualities.

The accompanying drawing represents a battery-jar, A, containing a porous plate, B, formed of black oxide of manganese, and a plate, C, formed of carbon, said plates having connections $c\ c'$ with the binding-posts $b\ b'$, attached to the cover D. The liquid used is dilute sulphuric acid containing an ammoniacal salt in solution.

In this battery I dispense with the great weight consequent on the use of metallic plates, and, as my plates are not coated, agitation of the battery does not interfere with its storage capacity.

The distinguishing characteristic of my invention is the use, in a secondary battery, of a black oxide of manganese plate and a plate of carbon.

What I claim as new, and desire to secure by Letters Patent of the United States, is—

1. In a secondary battery, the combination of a plate of black oxide of manganese with a carbon plate, substantially as and for the purposes set forth.

2. In a secondary battery, the combination of a plate of black oxide of manganese, a carbon plate, and a liquid containing an ammoniacal salt, substantially as and for the purposes set forth.

In testimony whereof I have affixed my signature, in presence of two witnesses, this 21st day of November, 1882.

JAMES A. MALONEY.

Witnesses:
A. K. PARRIS,
WM. LEWIS.